United States Patent
Burklin et al.

(10) Patent No.: US 9,264,470 B2
(45) Date of Patent: Feb. 16, 2016

(54) METHOD FOR REQUESTING A FILE REPAIR DISTRIBUTION MODE

(75) Inventors: Helmut Burklin, Rennes (FR); Vincent Alleaume, Cesson-Sévigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 560 days.

(21) Appl. No.: 12/998,294

(22) PCT Filed: Oct. 9, 2009

(86) PCT No.: PCT/EP2009/063192
§ 371 (c)(1),
(2), (4) Date: Apr. 6, 2011

(87) PCT Pub. No.: WO2010/040833
PCT Pub. Date: Apr. 15, 2010

(65) Prior Publication Data
US 2011/0197092 A1  Aug. 11, 2011

(30) Foreign Application Priority Data
Oct. 10, 2008  (EP) .................................... 08305668

(51) Int. Cl.
*G06F 11/00* (2006.01)
*H04L 29/06* (2006.01)
(Continued)

(52) U.S. Cl.
CPC .......... *H04L 65/4076* (2013.01); *H04L 1/1829* (2013.01); *H04L 65/4084* (2013.01);
(Continued)

(58) Field of Classification Search
CPC ............. H04L 1/1829; H04L 65/4076; H04N 21/6375
USPC ............................................ 714/18, 748, 751
See application file for complete search history.

(56) References Cited

U.S. PATENT DOCUMENTS 8,341,479 B2 * 12/2012 Bichot et al. .................. 714/748
2005/0182842 A1  8/2005 Walsh et al.
(Continued)

FOREIGN PATENT DOCUMENTS

| CN | 101001162 | 7/2007 |
|---|---|---|
| CN | 101277316 | 10/2008 |

(Continued)

OTHER PUBLICATIONS

Digital Video Broadcasting (DVB): IP Datacast over DVB-H: Content Delivery Protocols (CDP) Implemenation Guidelines, DVB Document A113r1, Apr. 2009.*

(Continued)

*Primary Examiner* — Michael Maskulinski
(74) *Attorney, Agent, or Firm* — Robert D. Shedd; Joseph J. Opalach

(57) ABSTRACT

The present invention concerns a receiver terminal and method at the receiver for requesting a missing symbol from a repair service, the method comprising the steps of receiving from a first server a list of at least one repair server and at least one transmission mode used by the at least one repair server, receiving from a second server a file comprising a plurality of symbols, checking the correct reception of the symbols, and if a missing has been identified, selecting a repair server and a transmissions mode and requesting the repair server to transmit missing symbols using the transmission mode.

14 Claims, 2 Drawing Sheets

(51) Int. Cl.
| | |
|---|---|
| *H04L 1/18* | (2006.01) |
| *H04N 21/2381* | (2011.01) |
| *H04N 21/254* | (2011.01) |
| *H04N 21/4363* | (2011.01) |
| *H04N 21/438* | (2011.01) |
| *H04N 21/442* | (2011.01) |
| *H04N 21/6332* | (2011.01) |
| *H04N 21/6375* | (2011.01) |
| *H04N 21/6377* | (2011.01) |
| *H04N 21/6408* | (2011.01) |
| *H04N 21/654* | (2011.01) |
| *H04N 21/6547* | (2011.01) |
| *H04N 21/658* | (2011.01) |
| *H04N 21/6587* | (2011.01) |
| *H04L 29/08* | (2006.01) |
| *H04L 1/00* | (2006.01) |

(52) U.S. Cl.
CPC ............ *H04L65/80* (2013.01); *H04L 67/06* (2013.01); *H04N 21/2381* (2013.01); *H04N 21/254* (2013.01); *H04N 21/4363* (2013.01); *H04N 21/4381* (2013.01); *H04N 21/44209* (2013.01); *H04N 21/6332* (2013.01); *H04N 21/6375* (2013.01); *H04N 21/6377* (2013.01); *H04N 21/6408* (2013.01); *H04N 21/654* (2013.01); *H04N 21/658* (2013.01); *H04N 21/6547* (2013.01); *H04N 21/6587* (2013.01); *H04L 2001/0092* (2013.01)

(56) References Cited

U.S. PATENT DOCUMENTS

| | | |
|---|---|---|
| 2005/0207415 A1 | 9/2005 | Curcio et al. |
| 2005/0216812 A1 | 9/2005 | Leon et al. |
| 2006/0023652 A1 | 2/2006 | Vedantham et al. |
| 2006/0023732 A1 | 2/2006 | Vedantham et al. |
| 2009/0204865 A1 | 8/2009 | Leon et al. |
| 2012/0176897 A1* | 7/2012 | Lohmar et al. ............... 370/231 |

FOREIGN PATENT DOCUMENTS

| | | | |
|---|---|---|---|
| EP | 1901525 | 3/2008 | |
| EP | 1921824 A1 * | 5/2008 | ............ H04L 29/08 |
| EP | 1926329 | 5/2008 | |
| WO | WO2005104421 | 11/2005 | |
| WO | 2006123212 | 11/2006 | |
| WO | WO2008/119673 | 10/2008 | |
| WO | WO2009140842 | 11/2009 | |

OTHER PUBLICATIONS

"File and Stream Distribution for Mobile Broadcase Services; OMA-TS-BCAST_Distribution-V1_0-20080907-C", Open Mobile Alliance, Aug. 7, 2008, pp. 1-78.

Search Report Dated Nov. 30, 2009.

Paila et al:" FLUTE File Delivery Over Unidirectional Transport " Network Working Group, Oct. 2004, pp. 1-31.

OMA Open Mobile Alliance—Mobile Broadcast Services V1.0—OMA-SUP-XSD_bcast_fd_associatedprocedure-V1_0—Feb. 12, 2009, 3 pages.

Lohmar et Al: "Performance Evaluation of a file repair procedure based on a combination of MBMS and unicast Bearers"Proceedings of The 2006 International Symposium on a World of Wireless, Mobile and Multimedia Networks IEEE 2006, 8 pages.

ETSI TS 102 591 V1.1.1 (2007-10)Digital Video Broadcasting (DVB)IP Datacast Over DVB-H: Content Delivery Protocols (CDP)Implementation Guidelines. pp. 30-56.

ETSI TS 102 472 V1.2.1 Digital Video Broadcasting IP Datacast over DVB-H:Content Delivery Protocols. Dec. 2006, 76 pages.

Fielding et al.: IETF RFC 2616—Hypertext Transfer Protocol HTTP/1.1—Jun. 1999, pp. 1-155.

ETSI TR 102 469 V1.1.1 (2006-05)—Digital Video Broadcasting (DVB); IP Datacast over DVB-H: Architecture, 38 pages.

* cited by examiner

METHOD FOR REQUESTING A FILE REPAIR DISTRIBUTION MODE

This application claims the benefit, under 35 U.S.C. §365 of International Application PCT/EP2009/063192, filed Oct. 9, 2009, which was published in accordance with PCT Article 21(2) on Apr. 15, 2010 in English and which claims the benefit of European patent application No. 08305668.9, filed Oct. 10, 2008.

FIELD OF THE INVENTION

The present invention relates generally to a file repair mechanism and in particular to a method for requesting a file repair distribution mode.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The IETF RFC 3926 defines the File Delivery over Unidirectional Transport protocol, noted FLUTE. The protocol defined in this standard is well adapted to answer the problems of scalability in terms of number of clients and heterogeneity in terms of bandwidth supported by the clients. The standard DVB-H IP Data-casting standard, <<ETSI TS 102 472 V1.2.1 (2006-12), Digital Video Broadcasting (DVB); IP Datacast over DVB-H; Content Delivery Protocols (CDP)>>, noted CDP standard hereinafter, defines a file repair mechanism. This mechanism is further explained in a second document, ETSI TS 102 591 1.1.1, Digital Video Broadcasting (DVB); IP Datacast over DVB-H: Content Delivery Protocols (CDP) Implementation Guidelines.

The file repair strategy adopted in DVB-H IP Data-casting standard is a one level file repair strategy and adopts the centralized client-server "File Repair" mode. It uses a file repair mechanism to assist the FLUTE protocol for achieving reliable file delivery over broadcast/multicast networks. Once it has detected the reception of an incomplete file, the FLUTE receiver launches a file repair mechanism. It consists in requesting the packets that are missing or corrupted. According to the FLUTE terminology, these packets are named symbols. The request is sent to a repair file server using a point-to-point connection. The request gathers basically the name of the file to be repaired and the list of missing symbols.

Inside such a system several repair servers, each containing one or more repair services may coexist. The list of all possible repair services is published in an "associated delivery procedure configuration file". This is an XML file that contains one URL for each usable repair service. When a repair server is needed, the client randomly chooses one of these services and addresses over the point to point link a repair request containing the list of requested symbols. The repair service either sends some or all of the requested symbols over the point to point link, or redirects the request to a different service. This redirection may indicate, instead of another repair server, the description of the FLUTE session over which the missing-or-corrupted received symbols are broadcasted again.

The file repair procedure is initiated by a client through the point-to-point link, and is further achieved using again a point-to-point link, or the broadcast channel, or even using a mix of these links. The client asks for all the missing symbols. After analyzing the list of symbols, the repair server selects the distribution mode. For efficient use of the resources, some symbols are distributed over the broadcast link and other symbols are sent over the point to point link.

An example of such a repair combining point-to-point and broadcast link usage is as follows. A client submits a repair query to a server. That server then answers to the repair request with a subset of the requested symbols over the point-to-point link. Then the repair client sends a second request for the still missing symbols to a repair server (that may be the same as previous). This time that repair server redirects it to the broadcast session where the remaining symbols may be recovered.

The distribution over the broadcast channel has the advantage of using less resource if a same symbol is requested by several client terminals. It may not be the best solution in certain conditions. For example, if a terminal has only access to the point-to-point network (after the loss of access to the broadcast channel), it will not receive any more content distributed in that broadcast channel. In the example of mixed repair depicted above, it will not be able to receive all the symbols requested in the repair query, as only part of the repair symbols are then distributed over the point-to-point network, while others are sent over the broadcast network. It would be desirable to provide a repair method for such devices that can receive content only in a specific manner (point to point only, mix mode, . . . ) or over specific networks, if, e.g., the terminal is connected via two different point-to-point links.

SUMMARY OF THE INVENTION

The present invention attempts to remedy at least some of the concerns connected with repair content distribution in the prior art, by providing a method where the receiver indicates the desired distribution mode to the server.

The present invention concerns a method at a receiver for requesting a missing symbol, the method comprising the steps of receiving from a first server a list of at least one repair server and at least one transmission mode used by each one of the at least one repair server, receiving from a second server a file comprising a plurality of symbols, checking the correct reception of the symbols, and if a missing symbol has been identified, selecting a repair server and a transmissions mode and requesting the repair server to transmit missing symbols using the transmission mode.

Advantageously, the receiver obtains the list of repair server together with the transmission mode that each one of these repair servers can use. Consequently, the receiver indicates the transmission mode it wants the repair server to use, in order to optimize the data reception from that repair server.

According to an embodiment of the invention, the transmission mode is a point to point mode and/or a broadcast mode.

When located in an area with broadcast reception quality is low, the receiver may then ask for a point to point transmission mode. If the broadcast quality reception is not so low, the receiver may ask for broadcast mode, or an hybrid mode using broadcast and point to point.

According to an embodiment of the invention, the requested transmission mode depends on a transmission cost and/or a broadcast reception quality.

The transmission cost is known in advance by the receiver. If using the point to point mode is costly, the receiver may wisely use that mode.

According to an embodiment of the invention, prior to the step of requesting, the method comprises the step of measuring the quality reception on the broadcast reception quality.

According to an embodiment of the invention, the list is comprised in an XML file of an associatedProcedureDescription.

According to an embodiment of the invention, the file is received according to the FLUTE protocol.

Another object of the invention is a receiver comprising communicating means for receiving data from a broadcast network and for communicating on a bidirectional network, file reception computing means for, on reception of a file from the broadcast network comprising a plurality of symbols, checking the correct reception of the symbols on the broadcast network, selecting means for selecting, from a list of at least one repair server and at least one transmission mode used by the at least one repair server, a repair server and a transmission mode, and file reception reporting means for sending a request to the repair server on the bidirectional network for requesting the repair server to transmit a missing symbol using the transmission mode.

According to an embodiment of the invention, the communicating means is adapted to receive a list of at least one repair server and at least one transmission mode used by the at least one repair server.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Another object of the invention is an XML configuration file of the type of associatedProcedureDescription comprising a list of at least one repair server and at least one transmission mode used by each one of the at least one repair server Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1 and 2, the represented blocks are purely functional entities, which do not necessarily correspond to physically separate entities.

Figure 1:
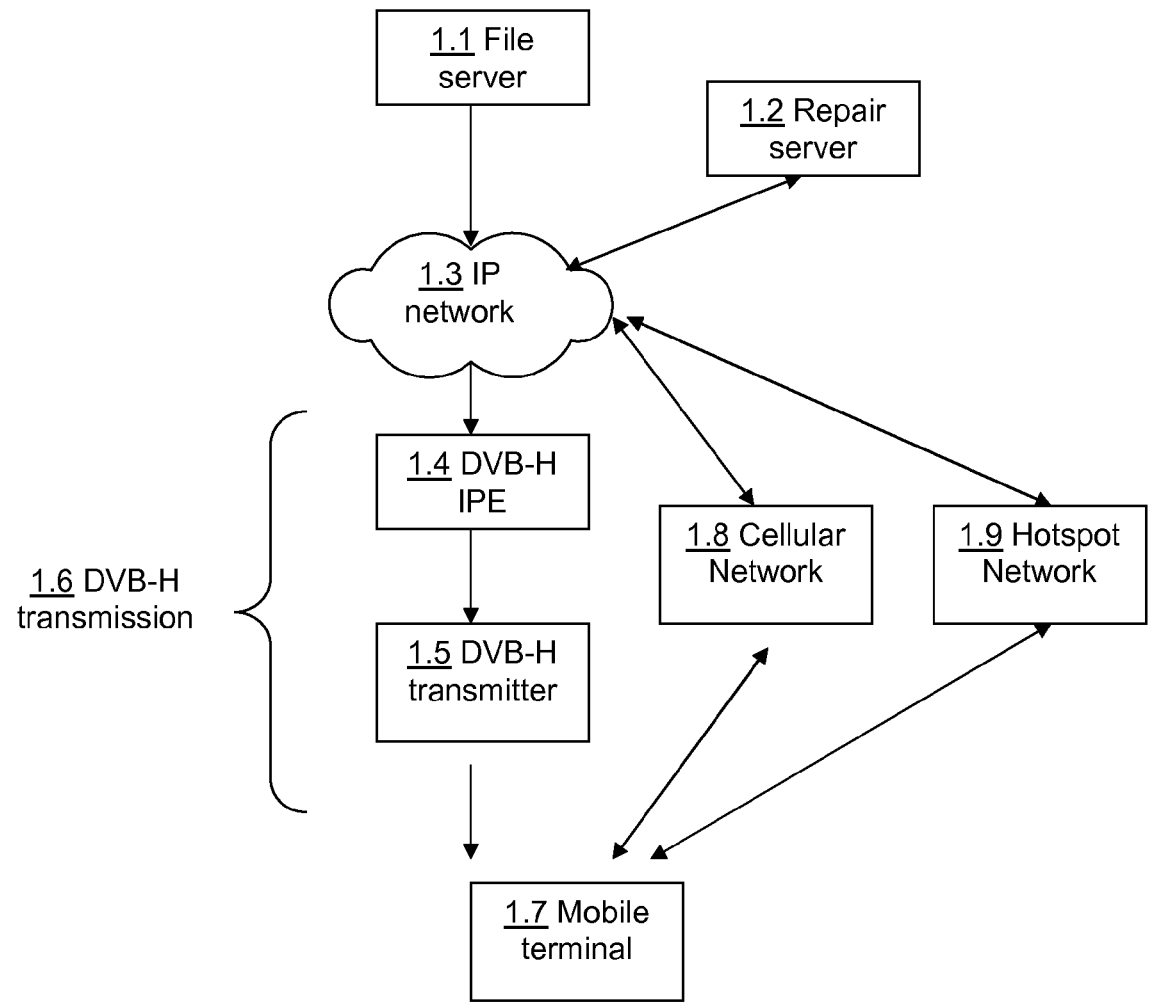
FIG. 1 is a system compliant with the embodiment.

Namely, they could be developed in the form of hardware or software, or be implemented in one or several integrated circuits.

DETAILED DESCRIPTION OF PREFERRED EMBODIMENTS

The exemplary embodiment comes within the framework of file repair in IP Datacast over DVB-H, but the invention is not limited to this particular environment and may be applied within other frameworks where a receiver may request a server to send content under various transmission modes.

According to a first embodiment, various repair services coexist. A file repair service exclusively uses the point to point channel. It is identified with an URI that terminates with the string "/p2p_only". Another repair service uses the broadcast channel. It is identified with the terminating strings "/bc-st_only". Another repair service uses the broadcast channel or the point to point channel. It is the hybrid service, identified with the string "/hyprid". In case further networks are available for the repair, they could of course be distinguished with further strings, as, e.g., /wimax_bcast, /wifi_p2p, etc An XML structure is defined in the OMA-BCAST standard OMA-BCAST, OMA-TS-BCAST_Distribution-V1_0-20080807-C, and in particular in the OMA-SUP-XSD_b-cast_fd_associatedprocedure-V1_0, to communicate the URLs of the available repair services to the terminal. An XML structure is also defined in DVB-CBMS. The file repair procedure is described as an associated file delivery procedure (linked to the related file delivery session) and related information is provided to the file receivers through that specific XML structure, before the file delivery session is started.

An example configuration file has the following form:

```
<?xml version="1.0" encoding="UTF-8"?>
<associatedProcedureDescription
        xmlns="urn:dvb:ipdc:cdp:associatedProcedures:2005"
    xmlns:xsi="http://www.w3.org/2001/XMLSchema-instance"
    xsi:schemaLocation="urn:dvb:ipdc:cdp:associatedProcedures:2005
    associated-procedure-description.xsd">
  <postFileRepair offsetTime="50" randomTimePeriod="600">
    <serverURI>"http://ipdcrepair.operator.umts/
        ipdc_file_repair_script"</serverURI>
    <serverURI>"http://ipdcrepair1.operator.umts/
        ipdc_file_repair_script"</serverURI>
    <serverURI>"http://ipdcrepair2.operator.umts/
        ipdc_file_repair_script/p2p_only"</serverURI>
    <serverURI>"http://ipdcrepair2.operator.umts/
        ipdc_file_repair_script/hybrid"</serverURI>
  </postFileRepair>
  <bmFileRepair sessionDescriptionURI="http://www.example.com/ipdc/
      session1.sdp"/>
</associatedProcedureDescription>
```

Under normal coverage conditions, where the client receives either in broadcast or point to point mode, the client requests repair symbols addressing a request at random to one of the four URIs given.

As an example such a request is as follows. The terminal submits the repair request using the HTTP protocol:

```
GET /ipdc_file_repair_script?fileURI=www.news.ipdc.com/latest/
    ipdcFileTest.txt&SBN=0;ESI=12,44,78&SBN=2&SBN=
    3;ESI=55-98 HTTP/1.1.
Host: http://ipdcrepair1.operator.com
```

A terminal may now be in special conditions, where it is able to receive repair symbols only over a subset of transmission modes or transmission channels. It may detect this by various means: low signal reception level, high error rate or low data rate on one of the channels, or prohibitive cost. It is also possible that it anticipates such conditions, since it detects to be on the border of the coverage. If the terminal decides that conditions allow receiving repair symbols only over the point to point link, it selects from the list one of the repair services indicating 'point to point only repair'.

In that case a repair request is:

```
GET /ipdc_file_repair_script/p2p_only?fileURI=www.news.ipdc.com/
    latest/ipdcFileTest.txt&SBN=0;ESI=12,44,78&
    SBN=2&SBN=3;ESI=55-98 HTTP/1.1.
Host: http://ipdcrepair2.operator.com
```

According to a second embodiment, the XML scheme itself is modified. The XML scheme adds the repair mode proposed by a repair server. This is an XML attribute, for each repair server described using such XML configuration tree. The attribute values are among the following: point-to-point only, hybrid point-to-point and broadcast repair, or even only broadcast repair. Further attributes may be used to designate the availability of further transmission channels, e.g. Wi-Fi, Wimax. This advantageously minimizes the changes to the XML configuration model.

The default repair server behavior (P2P repair only, hybrid repair, or broadcast only) is known by receivers. The default repair server behavior to be expected is preferably the hybrid repair mode.

If the optional information is not provided, the receiver assumes the repair server can use any of the 3 modes (P2P only, hybrid, broadcast only).

An example of an XML file implementing such modified XML scheme in the case of DVB-CBMS:

```
<?xml version="1.0" encoding="UTF-8"?>
<associatedProcedureDescription
    xmlns="urn:dvb:ipdc:cdp:associatedProcedures:2005"
    xmlns:xsi="http://www.w3.org/2001/XMLSchema-instance"
    xsi:schemaLocation="urn:dvb:ipdc:cdp:associatedProcedures:2008
    associated-procedure-description.xsd">
  <postFileRepair offsetTime="50" randomTimePeriod="600">
    <serverURI repairMode="P2P_ONLY">
      "http://ipdc.op.umts/ipdc_file_repair_script"
    </serverURI>
    <serverURI>
      "http://ipdc.op2.umts/ipdc_file_repair"
    </serverURI>
    <serverURI repairMode="HYBRID">
      "http://ipdc.op.umts/ipdc_file_repair_script"
    </serverURI>
    <serverURI repairMode="HYBRID">
      "http://ipdc.op.umts/ipdc_file_repair_script"
    </serverURI>
    <serverURI repairMode="BCAST_ONLY">
      "http://ipdc.op.umts/ipdc_file_repair_script"
    </serverURI>
  </postFileRepair>
  <bmFileRepair sessionDescriptionURI="http://www.example.com/ipdc/
      session1.sdp"/>
</associatedProcedureDescription>
```

A variant to the second embodiment is a XML scheme that allows a file receiver to acquire a description of more than one list of repair servers, each with explicit repair mode capability description. One list is related to the repair servers that are doing point-to-point only repair, another list to the repair servers that can provide hybrid repair (point-to-point combined with broadcast), or a list of server that are doing broadcast repair only.

An example of such XML scheme in the case of DVB-CBMS is as follows:

```
<?xml version="1.0" encoding="UTF-8"?>
<associatedProcedureDescription
    xmlns="urn:dvb:ipdc:cdp:associatedProcedures:2005"
    xmlns:xsi="http://www.w3.org/2001/XMLSchema-instance"
    xsi:schemaLocation="urn:dvb:ipdc:cdp:associatedProcedures:2008
    associated-procedure-description.xsd">
  <postFileRepair offsetTime="50" randomTimePeriod="600">
    <P2P_ONLY_serverList>
      <serverURI>
        "http://ipdc.op.umts/ipdc_file_repair_script"
      </serverURI>
      <serverURI>
        "http://ipdc.op2.umts/ipdc_file_repair"
      </serverURI>
    </P2P_ONLY_serverList>
    <HYBRID_serverList>
      <serverURI>
        "http://ipdc.op.umts/ipdc_file_repair_script"
      </serverURI>
      <serverURI>
        "http://ipdc.op.umts/ipdc_file_repair_script"
      </serverURI>
    </HYBRID_serverList>
    <BCAST_ONLY_serverList>
      <serverURI>
        "http://ipdc.op.umts/ipdc_file_repair_script"
      </serverURI>
    </BCAST_ONLY_serverList>
  </postFileRepair>
  <bmFileRepair sessionDescriptionURI="http://www.example.com/ipdc/
      session1.sdp"/>
</associatedProcedureDescription>
```

According to a third embodiment, the repair mode is indicated in an HTTP extension header. The HTTP extension header is defined in the IETF RFC 2616 that specifies the HTTP 1.1. The receiver adds a specific header to the repair request to signal the repair mode type (P2P only, hybrid, or broadcast only).

If such an enhanced repair request is sent to a legacy HTTP.1.1 compatible repair server, it is simply seen as an extension-header and ignored by the server.

An example of such extended repair query in OMA BCAST context, using a new header field RepairMode providing 3 options: P2P_ONLY or HYBRID or BCAST_ONLY:

```
GET /path/repair_script?fileURI=www.example.com/news/latest.3g
    p&Content-MD5=ODZiYTU1OTFkZGY2NWY5ODh==
    &SBN=5;ESI=12&SBN=20;ESI=27 HTTP/1.1
Host: mbmsrepair1.example.com
RepairMode: HYBRID
```

A first variant to the third embodiment is to define the field value as a comma separated list of the allowed repair modes and channels 3G-P2P, Wifi-P2P and DVB-H-BCAST.

The example hereinabove then becomes:

```
GET /path/repair_script?fileURI=www.example.com/news/latest.3g
    p&Content-MD5=ODZiYTU1OTFkZGY2NWY5ODh==
    &SBN=5;ESI=12&SBN=20;ESI=27 HTTP/1.1
Host: mbmsrepair1.example.com
RepairMode: 3G-P2P,DVB-H-BCAST
```

A second variant to the third embodiment is to add the preferred repair mode in the repair request. Here the legacy HTTP repair query is enhanced with the addition of the parameter (e.g. RepairMode), associated to possibly 3 values to indicate the preferred repair mode for that query: P2P ONLY or HYBRID repair or Broadcast only.

Here is an example of such extended repair query in OMA BCAST context, using that new parameter RepairMode providing 3 options: P2P_ONLY or HYBRID or BCAST_ONLY:

```
GET /path/repair_script?fileURI=www.example.com/news/latest.3g
    p&RepairMode=P2P_ONLY&Content-MD5=
    ODZiYTU1OTFkZGY2NWY5ODh==&SBN=5;ESI=12&SBN=
    20;ESI=27 HTTP/1.1
Host: mbmsrepair1.example.com
```

A third variant to the third embodiment is to use the header fields in the request together with a special header in the response. If the client has signaled that it is ready to accept hybrid or broadcast repair (for backwards compatibility reasons only in this case), the server may indicate in a response header the session information for the broadcast repair. This reduces the number of exchanges between server and client in the hybrid repair mode; no second request by the client is needed to recover the, possibly dynamic, broadcast session information.

According to this variant, the answer to a request according to the third embodiment, or to a request according to the first variant of the third embodiment is:

```
HTTP/1.1 200 OK
Content-Type: application/simpleSymbolContainer
BcastSDP: http://www.example.com/ipdc/session1.sdp
<followed by the payload>
``` indicating that all requested symbols not provided in the response's body (in point to point link) are expected to be provided through the indicated broadcast session.

The system for video distribution according to the embodiment is illustrated in FIG. 1. The video broadcast network 1.6 is compliant with the ETSI TR 102 469 V1.1.1 (2006-05), "Digital Video Broadcasting (DVB); IP Datacast over DVB-H: Architecture", noted IP datacast standard hereinafter.

The system is also compliant with the ETSI TS 102 472 V1.2.1 (2006-12), "Digital Video Broadcasting (DVB); IP Datacast over DVB-H: Content Delivery Protocols" noted CDP standard hereinafter.

The file server 1.1 sends data files according to the CDP standard and the FLUTE protocol. The data files are delivered to the mobile terminal 1.7 over the IP network 1.3 and the DVB-H broadcast network 1.6. The IP network may be any IP network supporting multicast transmission, such as the Internet. The DVB-H transmission network comprises among others a DVB-H IP Encapsulator 1.4 and a DVB-H transmitter 1.5. Of course, the embodiment is not limited to the DVB-H network. It could apply to any other broadband distribution network such as the digital subscriber line family.

The system also comprises a return channel through the cellular network 1.8 or an hot-spot network 1.9. The mobile terminal may receive and send data through the return channel, in particular interactive data. Of course, the return channel might be any other type of channel that provides a point-to-point bidirectional connection. The system is a simplified file repair infrastructure associated with DVB-H as defined in CDP standard. The terminal submits the repair requests to a repair server 1.2 in order to recover packets, which are the FLUTE symbols, detected as missing or corrupted. The repair server stores a copy of the files that have been downloaded. The repair server sends back to the terminal the requested packets if available.

The mobile terminal transmits through the return channel among other the packet loss information that is defined hereinafter to the file server.

Figure 2:
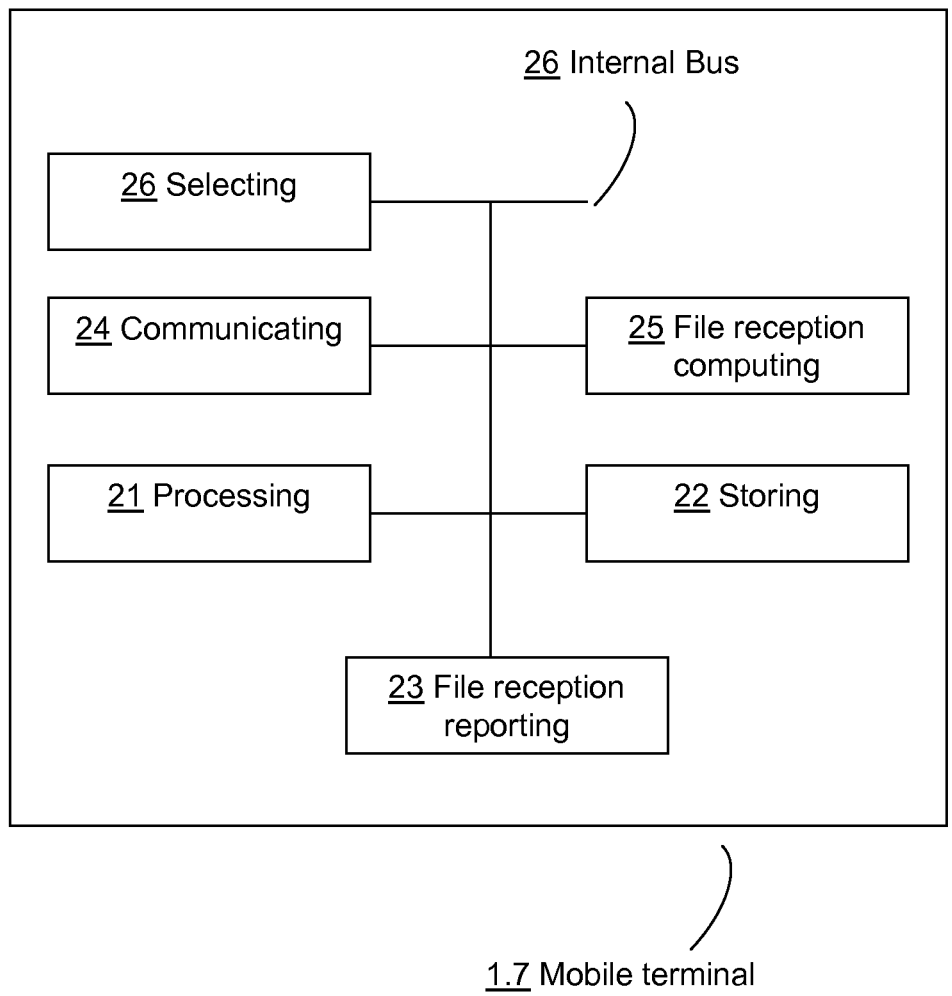
FIG. 2 represents a mobile terminal according to the embodiment.

The mobile terminal 1.7 is represented on FIG. 2. According to the embodiment, it is a terminal compliant with the IP datacast standards. It comprises a communicating module 24 for receiving data from the broadcast network, in particular the DVB-H network, and for sending and receiving data on the return channel, in particular the cellular network. It comprises a storing module 22 for storing data received from the broadcast channel, among others FDT and ESG information. The terminal comprises a processing module 21, and an internal bus 26 for allowing communication between modules. The terminal comprises a file reception computing module 25 for checking the file reception, as indicated hereinabove. The terminal also comprises a file reception reporting module 23 for reporting the files that are received or not to the file server. In particular, the file reception reporting module sends requests to the repair servers as indicated hereinabove. It also comprises a selecting module 26 for selecting the transmission mode that is requested to the server, as indicated hereinabove. The transmission mode is indicated in the repair request sent to the repair server.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method comprising:
    receiving from a first server a list of more than one repair server and more than one transmission mode used by each one of said more than one repair server;
    receiving from a second server a file comprising a plurality of packets;
    checking for the correct reception of the packets; and
    if a missing packet has been identified by the checking, selecting a repair server among said list of more than one repair server and a transmission mode among said more than one transmission mode and requesting said selected repair server to transmit said missing packet using said selected transmission mode.

2. Method according to claim 1, said transmission mode being a point to point mode.

3. Method according to claim 1, the transmission mode depending on a transmission cost.

4. Method according to claim 3, said list being comprised in an XML file of an associatedProcedureDescription.

5. Method according to claim 3, said file being received according to the FLUTE protocol.

6. Method according to claim 1, said list being comprised in an XML file of an associatedProcedureDecscription.

7. Method according to claim 1, said transmission mode being a broadcast mode.

8. Method according to claim 1, said transmission mode depending on a broadcast reception quality.

9. Method according to claim 8, comprising, prior to the step of requesting, the step of measuring the quality reception on the broadcast reception quality.

10. Method according to claim 8, said list being comprised in an XML file of an associatedProcedureDescription.

11. Method according to claim 8, said file being received according to the FLUTE protocol.

12. A receiver comprising:
- communicating module that receives data from a broadcast network and for communicating on a bidirectional network;
- file reception computing module, on reception of a file from the broadcast network comprising a plurality of packets, that checks correct reception of said packets on said broadcast network;
- selecting module that selects, from a list of more than one repair server and more than one transmission mode used by each one of said more than one repair server, a repair server and a transmission mode; and
- file reception reporting module that sends a request to said selected repair server on said bidirectional network for requesting said repair server to transmit a missing packet using said selected transmission mode among said more than one transmission mode.

13. Receiver according to claim 12, said communicating module being adapted to receive a list of more than one repair server and more than one transmission mode used by each one of said more than one repair server.

14. A non-transitory computer-readable storage medium comprising a computer program product with program code instructions for executing on a computer, comprising:
- receiving from a first server a list of more than one repair server and more than one transmission mode used by each one of said more than one repair server;
- receiving from a second server a file comprising a plurality of packets;
- checking the correct reception of the packets; and
- if a missing packet has been identified, selecting a repair server among said list of more than one repair server and a transmission mode among said more than one transmission mode and requesting said repair server to transmit missing packets using said transmission mode.

* * * * *